(12) United States Patent
Cheng et al.

(10) Patent No.: US 11,115,150 B2
(45) Date of Patent: Sep. 7, 2021

(54) METHODS AND DEVICES FOR REPORTING CSI DURING DRX OPERATIONS

(71) Applicant: FG Innovation Company Limited, Tuen Mun (CN)

(72) Inventors: Chien-Chun Cheng, Taipei (TW); Chia-Hung Wei, Hsinchu (TW); Yu-Hsin Cheng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/404,879

(22) Filed: May 7, 2019

(65) Prior Publication Data

US 2019/0349120 A1    Nov. 14, 2019

Related U.S. Application Data

(60) Provisional application No. 62/668,912, filed on May 9, 2018.

(51) Int. Cl.
*H04L 1/00* (2006.01)
*H04W 72/04* (2009.01)
(Continued)

(52) U.S. Cl.
CPC ......... *H04L 1/0026* (2013.01); *H04B 7/0626* (2013.01); *H04L 1/1819* (2013.01); *H04L 5/0053* (2013.01); *H04W 24/10* (2013.01); *H04W 72/042* (2013.01); *H04W 76/28* (2018.02); *H04W 80/02* (2013.01)

(58) Field of Classification Search
CPC ... H04L 1/0026; H04L 5/0053; H04L 1/1819; H04L 5/0057; H04L 5/0094; H04L 5/0078; H04L 1/0027; H04W 72/042; H04W 24/10; H04W 80/02; H04W 76/28; H04W 48/12; H04W 72/085; H04B 7/0626

See application file for complete search history.

(56) References Cited

U.S. PATENT DOCUMENTS

2010/0202311 A1    8/2010  Lunttila et al.
2011/0019637 A1*   1/2011  Ojala ................... H04L 1/0026
                                                              370/329

(Continued)

OTHER PUBLICATIONS

3GPP TS 38.213 V15.1.0 3rd Generation Partnership Project; Technical Specification Group Radio Access Network; NR; Physical layer procedures for control (Release 15) (Mar. 2018).

(Continued)

*Primary Examiner* — Ayaz R Sheikh
*Assistant Examiner* — Tarell A Hampton
(74) *Attorney, Agent, or Firm* — ScienBiziP, P.C.

(57) ABSTRACT

A method for a user equipment (UE) is disclosed. The method includes receiving, by the UE, Downlink Control Information (DCI), the DCI containing an aperiodic channel state information (CSI) reporting configuration. The method also includes when the DCI is received by the UE during a Discontinuous Reception (DRX) operation mode, transmitting, by the UE, an aperiodic CSI report according to a transmission time indicated by the aperiodic CSI reporting configuration regardless of whether the transmission time for the CSI report is within active or non-active time periods of the DRX operation mode.

12 Claims, 7 Drawing Sheets

(51) Int. Cl.
*H04W 24/10* (2009.01)
*H04L 5/00* (2006.01)
*H04W 80/02* (2009.01)
*H04L 1/18* (2006.01)
*H04B 7/06* (2006.01)
*H04W 76/28* (2018.01)

(56) References Cited

U.S. PATENT DOCUMENTS

| | | | | |
|---|---|---|---|---|
| 2011/0249578 A1* | 10/2011 | Nayeb Nazar | | H04W 72/10 370/252 |
| 2011/0249582 A1* | 10/2011 | Choi | | H04L 5/0053 370/252 |
| 2012/0113905 A1* | 5/2012 | Anderson | | H04W 76/38 370/329 |
| 2012/0127869 A1* | 5/2012 | Yin | | H04L 5/001 370/252 |
| 2012/0176884 A1* | 7/2012 | Zhang | | H04W 72/042 370/203 |
| 2012/0230268 A1* | 9/2012 | Marinier | | H04B 7/0632 370/329 |
| 2013/0235756 A1* | 9/2013 | Seo | | H04L 1/0027 370/252 |
| 2014/0036880 A1* | 2/2014 | Dalsgaard | | H04W 74/004 370/336 |
| 2014/0105049 A1* | 4/2014 | Kim | | H04W 24/10 370/252 |
| 2014/0254538 A1* | 9/2014 | Park | | H04W 56/00 370/329 |
| 2015/0208461 A1* | 7/2015 | Lee | | H04L 5/0048 370/311 |
| 2016/0143086 A1* | 5/2016 | Kahtava | | H04W 76/28 370/311 |
| 2016/0294531 A1* | 10/2016 | Loehr | | H04W 72/0446 |
| 2016/0323901 A1* | 11/2016 | Yum | | H04W 72/085 |
| 2017/0048919 A1* | 2/2017 | Gaal | | H04L 5/1469 |
| 2017/0126299 A1* | 5/2017 | Wei | | H04W 24/10 |
| 2018/0097598 A1* | 4/2018 | Ang | | H04L 5/0048 |
| 2019/0021052 A1* | 1/2019 | Kadiri | | H04W 24/10 |
| 2021/0028844 A1* | 1/2021 | Song | | H04W 76/28 |

OTHER PUBLICATIONS

3GPP TS 38321 V15.1.0 3rd Generation Partnership Project; Technical Specification Group Radio Access Network; NR; Medium Access Control (MAC) protocol specification (Release 15) (Mar. 2018).

* cited by examiner

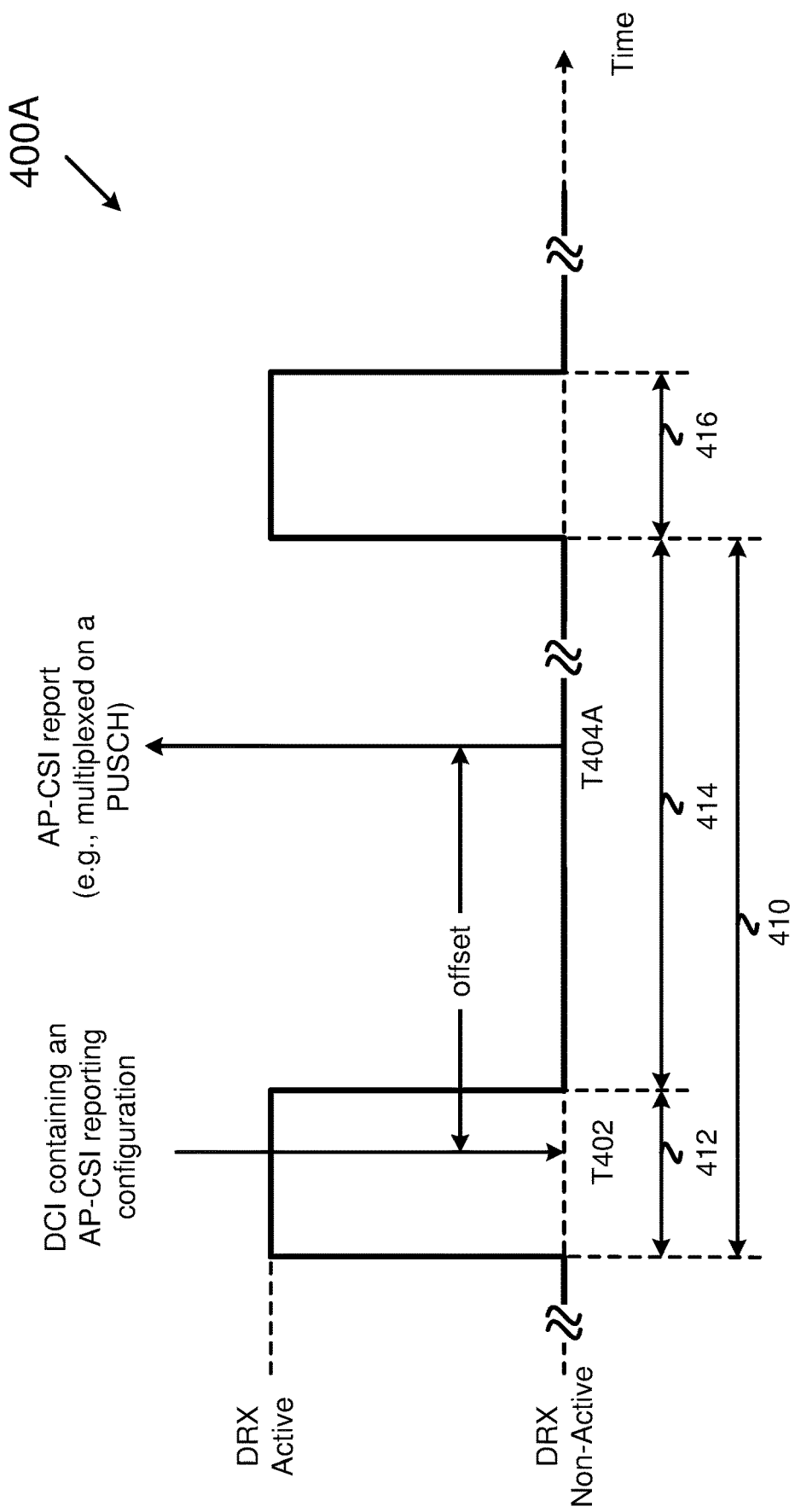

METHODS AND DEVICES FOR REPORTING CSI DURING DRX OPERATIONS

CROSS-REFERENCE TO RELATED APPLICATION(S)

The present application claims the benefit of and priority to a provisional U.S. Patent Application Ser. No. 62/668,912 filed on May 9, 2018, entitled "Method and apparatus for CSI reporting on PUSCH upon DRX". The disclosure of the application is hereby incorporated fully by reference into the present application.

FIELD

The present disclosure generally relates to wireless communications, and more particularly, to methods and devices for reporting channel state information (CSI) during discontinuous reception (DRX) operations.

BACKGROUND

In a wireless communication network, such as a long term evolution (LTE) or an evolved LTE (eLTE) network, downlink scheduling and downlink data transmission can be adaptively controlled based on conditions of the paths (e.g., channels) between a base station and a user equipment (UE). For example, if a modulation and coding scheme and/or spatial multiplexing is used in a downlink, the UE needs to calculate received quality information or channel state information (CSI), with reference to a downlink CSI reference signal (CSI-RS) that is transmitted from the base station, and report the calculated received quality information (or CSI) to the base station through an uplink channel (e.g., a Physical Uplink Control Channel (PUCCH) or Physical Uplink Shared Channel (PUSCH)). The CSI may include, but is not limited to, a channel quality indicator (Channel Quality Indicator, CQI), a precoding matrix indicator (Precoding Matrix Indicator, PMI), a rank indicator (Rank Indicator, RI), and the like. The UE may report the CSI in certain time intervals (e.g., periodic CSI reporting) or only upon when the network requests it to do so (e.g., aperiodic CSI reporting).

According to 3GPP TS 38.213 (NPL1), it has been agreed that CSI reports originally configured for a PUCCH can be multiplexed on a PUSCH. Thus, periodic CSI reporting multiplexed on a PUSCH and a PUCCH-based semi-persistent CSI (SP-CSI) reporting multiplexed on a PUSCH will be present in the next generation (e.g., $5^{th}$ generation (5G)) wireless communication systems. These periodic reporting events are not covered by the Medium Access Control (MAC) entity, resulting in potential issues if discontinuous reception (DRX) is configured.

During DRX, a UE may switch off its RF module and/or suspend control channel monitoring between data transmissions to reduce power consumption. The UE may periodically monitor the control channel (e.g., a physical downlink control channel (PDCCH)) with preconfigured ON/OFF cycles based on, for example, the base station's configuration and real traffic pattern, even when there is no data transmission. During active time (e.g., ON cycles), the UE monitors the PDCCH for possible data transmission/reception indication. When data transmission occurs during the active time, the UE may stay active to finish the transmission. When operating under DRX, the UE may monitor channel state information (CSI), for example, of a downlink (DL) channel, and provide a CSI report.

In current MAC specification, the CSI reporting under DRX function is specified as below.

```
TS 38.321 v15.1.0
When DRX is configured, the MAC entity shall:
  1> if CQI masking (cqi-Mask) is setup by upper layers:
    2> if drx-onDurationTimer is not running:
      3> not report CSI on PUCCH.
  1> else:
    2> if the MAC entity is not in Active Time:
      3> not report CSI on PUCCH.
```

As can be seen above, the current MAC specification merely describes CSI reporting on a PUCCH. However, in a situation where a PUCCH is multiplexed on a PUSCH when DRX is configured, how the reporting events should be handled and/or controlled during DRX has not been considered.

Thus, there is a need in the art for methods and devices for reporting CSI during DRX operations in the next generation wireless communication networks.

SUMMARY

The present disclosure is directed to methods and devices for reporting CSI during DRX operations.

According to a first aspect of the present disclosure, a method for a user equipment (UE) is disclosed, the method comprising receiving, by the UE, Downlink Control Information (DCI), the DCI containing an aperiodic channel state information (CSI) reporting configuration; when the DCI is received by the UE during a Discontinuous Reception (DRX) operation mode, transmitting, by the UE, an aperiodic CSI report according to a transmission time indicated by the aperiodic CSI reporting configuration regardless of whether the transmission time for the CSI report is within active or non-active time periods of the DRX operation mode.

According to an implementation of the first aspect, the DCI is received by the UE during an active time period of the DRX operation mode.

According to another implementation of the first aspect, the aperiodic CSI report is transmitted by a medium access control (MAC) entity of the UE.

According to yet another implementation of the first aspect, the aperiodic CSI report is transmitted on a physical uplink shared channel (PUSCH).

According to yet another implementation of the first aspect, the method also includes measuring, by the UE, a channel state of a downlink channel according to the aperiodic CSI reporting configuration; configuring, by the UE, the CSI report based on measurement results.

According to yet another implementation of the first aspect, when the DCI is received by the UE before the DRX operation mode, and the transmission time for transmitting the aperiodic CSI report is within a non-active time period of the DRX operation mode, the UE does not transmit the aperiodic CSI report; when the DCI is received by the UE before the DRX operation mode, and the transmission time for transmitting the aperiodic CSI report is within an active time period of the DRX operation mode, the UE transmits the aperiodic CSI report.

According to a second aspect of the present disclosure, a user equipment (UE) is disclosed, the UE comprising one or more non-transitory computer-readable media having computer-executable instructions embodied thereon; at least one processor coupled to the one or more non-transitory computer-readable media, and configured to execute the computer-executable instructions to: receive, by reception circuitry, Downlink Control Information (DCI), the DCI containing an aperiodic channel state information (CSI) reporting configuration; when the DCI is received by the UE during a Discontinuous Reception (DRX) operation mode, transmit, by transmission circuitry, an aperiodic CSI report according to a transmission time indicated by the aperiodic CSI reporting configuration regardless of whether the transmission time for the CSI report is within active or non-active time periods of the DRX operation mode.

According to an implementation of the second aspect, the DCI is received by the UE during an active time period of the DRX operation mode.

According to another implementation of the second aspect, the aperiodic CSI report is transmitted by a medium access control (MAC) entity of the UE.

According to yet another implementation of the second aspect, the aperiodic CSI report is transmitted on a physical uplink shared channel (PUSCH).

According to yet another implementation of the second aspect, the at least one processor is further configured to execute the computer-executable instructions to: measure a channel state of a downlink channel according to the aperiodic CSI reporting configuration; configure the CSI report based on measurement results.

According to yet another implementation of the second aspect, when the DCI is received by the UE before the DRX operation mode, and the transmission time for transmitting the aperiodic CSI report is within a non-active time period of the DRX operation mode, the UE does not transmit the aperiodic CSI report; when the DCI is received by the UE before the DRX operation mode, and the transmission time for transmitting the aperiodic CSI report is within an active time period of the DRX operation mode, the UE transmits the aperiodic CSI report.

According to a third aspect of the present disclosure, a method by a base station is disclosed, the method comprising: configuring, by the base station, an aperiodic channel state information (CSI) reporting configuration, the aperiodic CSI reporting configuration having a transmission time for an aperiodic CSI report; transmitting, by the base station, the aperiodic CSI reporting configuration to a user equipment (UE) through Downlink Control Information (DCI); when the DCI is transmitted to the UE during a Discontinuous Reception (DRX) operation mode, receiving, by the base station, the aperiodic CSI report according to the transmission time indicated by the aperiodic CSI reporting configuration regardless of whether the transmission time for the CSI report is within active or non-active time periods of the DRX operation mode.

According to an implementation of the third aspect, the DCI is transmitted to the UE during an active time period of the DRX operation mode.

According to another implementation of the third aspect, the aperiodic CSI report is received by the base station on a physical uplink shared channel (PUSCH).

According to yet another implementation of the third aspect, when the DCI is transmitted to the UE before the DRX operation mode, and the transmission time for transmitting the aperiodic CSI report is within a non-active time period of the DRX operation mode, the UE does not transmit the aperiodic CSI report; when the DCI is transmitted to the UE before the DRX operation mode, and the transmission time for transmitting the aperiodic CSI report is within an active time period of the DRX operation mode, the UE transmits the aperiodic CSI report.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

FIG. 4A is a diagram illustrating a UE's behaviors for reporting AP-CSI when the UE is in a DRX operation mode, in accordance with example implementations of the present application.

DETAILED DESCRIPTION

Figure 1:
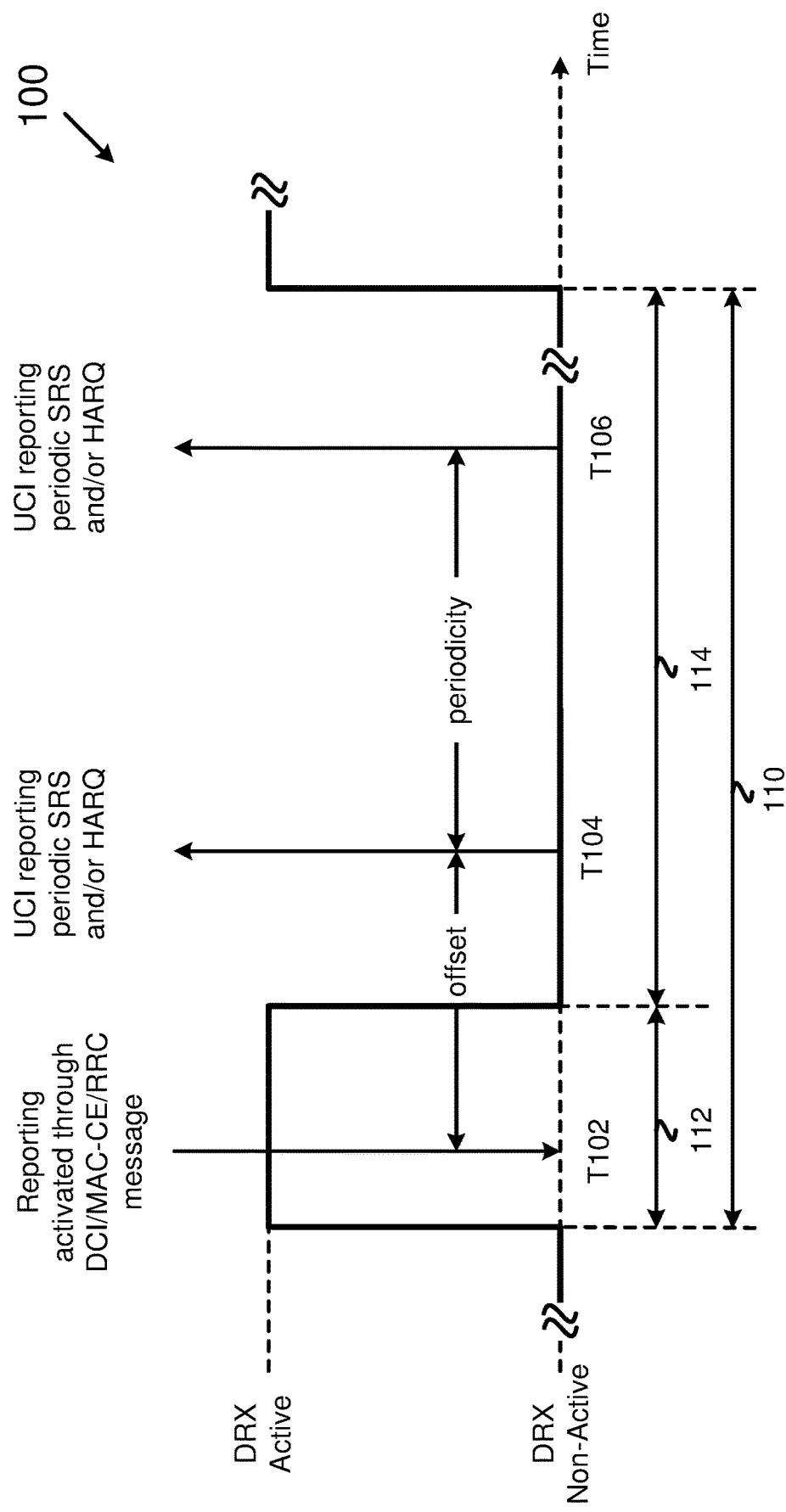
FIG. 1 is a diagram illustrating a UE's behaviors for reporting aperiodic sounding reference signal (SRS), HARQ-ACK/NACK when the UE is in a DRX operation mode.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read Only Memory (CD ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an internet) through a Radio Access Network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A base station may include, but is not limited to, a Node B (NB) as in the UMTS, an evolved Node B (eNB) as in the LTE-A, a Radio Network Controller (RNC) as in the UMTS, a Base Station Controller (BSC) as in the GSM/GERAN, an NG-eNB as in an E-UTRA base station in connection with the 5GC, a gNB as in the 5G-AN, and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible configurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least DownLink (DL) transmission data, a guard period, and UpLink (UL) transmission data should be included. Additionally, the respective portions of the DL transmission data, the guard period, and the UL transmission data should also be configurable, for example, based on the network dynamics of NR. In addition, SL resource may also be provided in an NR frame to support ProSe services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

Cross-carrier scheduling may be used to reduce the UE complexity. With cross-carrier scheduling, the UE may receive a PDCCH on a Component Carrier (CC) (or called "a cell" in the present disclosure) other than a cell on which a PDSCH is received. For example, for a Secondary Cell (SCell) cross-carrier scheduled on a Primary Cell (PCell), the UE may receive the PDCCH of the SCell on the PCell, and use the scheduling information contained in the PDCCH to receive the PDSCH on the SCell. In such an example, the SCell is a cross-carrier scheduled cell (hereafter referred to as "a scheduled cell"), and the PCell is a cross-carrier scheduling cell (hereafter referred to as "a scheduling cell"). According to the general meaning, a scheduled cell may refer to a cell to be cross-carrier scheduled on other cell, and a scheduling cell may refer to a cell that carries cross-carrier scheduling information of other cells.

Uplink control information (UCI), such as Hybrid Automatic Repeat Request (HARQ)-Acknowledgement (HARQ-ACK), scheduling request (SR), and CSI, may be transmitted from a UE to a base station using a PUCCH. In addition, UCI may be multiplexed on a PUSCH channel, for example, by rate matching or puncturing the PUSCH. According to the current specification, NR supports a feature that PUCCH-based UCI is reported on PUSCH without UL-SCH data. When the UCI is multiplexed on a PUSCH without UL-SCH data, there is no transport block (TB) for the UL-SCH, and only UCI on the current PUSCH is transmitted. Since no TB is sent, no HARQ is involved. Hence, the transmission of UCI may not be considered as a new transmission.

In addition, in the current MAC specification, the DRX inactivity timer is to start or restart when PDCCH indicates a new DL/UL transmission. The related context in specification is provided in TS 38.321 v 15.1.0, the content of which is incorporated by reference in its entirety.

If no UL-SCH data is present and UCI is not considered as a new UL transmission, the following cases may not restart the DRX inactivity timer:

Periodic-CSI (P-CSI) reporting multiplexed on PUSCH;
PUCCH-based Semi-Persistent-CSI (SP-CSI) reporting multiplexed on PUSCH;
Aperiodic-CSI (AP-CSI) reporting on PUSCH;
PUSCH-based SP-CSI reporting.

FIG. 1 is a diagram illustrating a UE's behaviors for reporting aperiodic sounding reference signal (SRS), HARQ-ACK/NACK when the UE is in a DRX operation mode. As shown in FIG. 1, diagram 100 shows that at time T102, a reporting is activated through a DCI message, a Media Access Control (MAC)-Control Element (MAC-CE), or a Radio Resource Control (RRC) message. For example, a report configuration is transmitted from a base station to a UE during DRX active time period 112 of DRX cycle 110. The UE may transmit a report to the base station based on a transmission time indicated in the reporting configuration.

For example, the UE may report periodic SRS and/or HARQ during DRX non-active time period 114, for example, at time T104 and time T106.

However, whether and how a UE should report CSI during DRX non-active time may need further investigation. Various implementations of the present application include the UE's behaviors for reporting CSI during DRX non-active time.

In some implementations of the present application, when AP-CSI reporting is activated during a DRX active time, a UE may transmit an AP-CSI report during a DRX non-active time. The UE may multiplex the AP-CSI (along with other UCI reporting if any) on a PUSCH regardless of whether the transmission time for the AP-CSI report is within DRX active or non-active time periods.

In some implementations of the present application, when AP-CSI reporting is not activated during a DRX active time, the UE does not report AP-CSI during DRX non-active Time. The UE drops the related CSI report when the resource elements (Res) for reporting are scheduled in DRX non-active time periods, and skips the related CSI measurements if the AP-CSI report is to be dropped.

In some implementations of the present application, for AP-CSI reporting, the configuration on AP-CSI reporting, e.g., the status of activation, should not be changed or released by the switching between DRX active and non-active time periods. Also, AP-CSI related configuration for DL reference signal (RS) and UL resource grants should not be changed.

In some implementations of the present application, for the MAC entity, drx-InactivityTimer may not be started or restarted by receiving the DCI for activation of AP-CSI reporting. Similarly, drx-InactivityTimer may not be started or restarted by the UE behavior on transmission or dropping for AP-CSI reporting. This means that the AP-CSI reporting should not belong to a new data transmission and/or a scheduling, and the UE should not stay in DRX active (or extend the DRX active time) regardless of the AP-CSI reporting.

Figure 2:
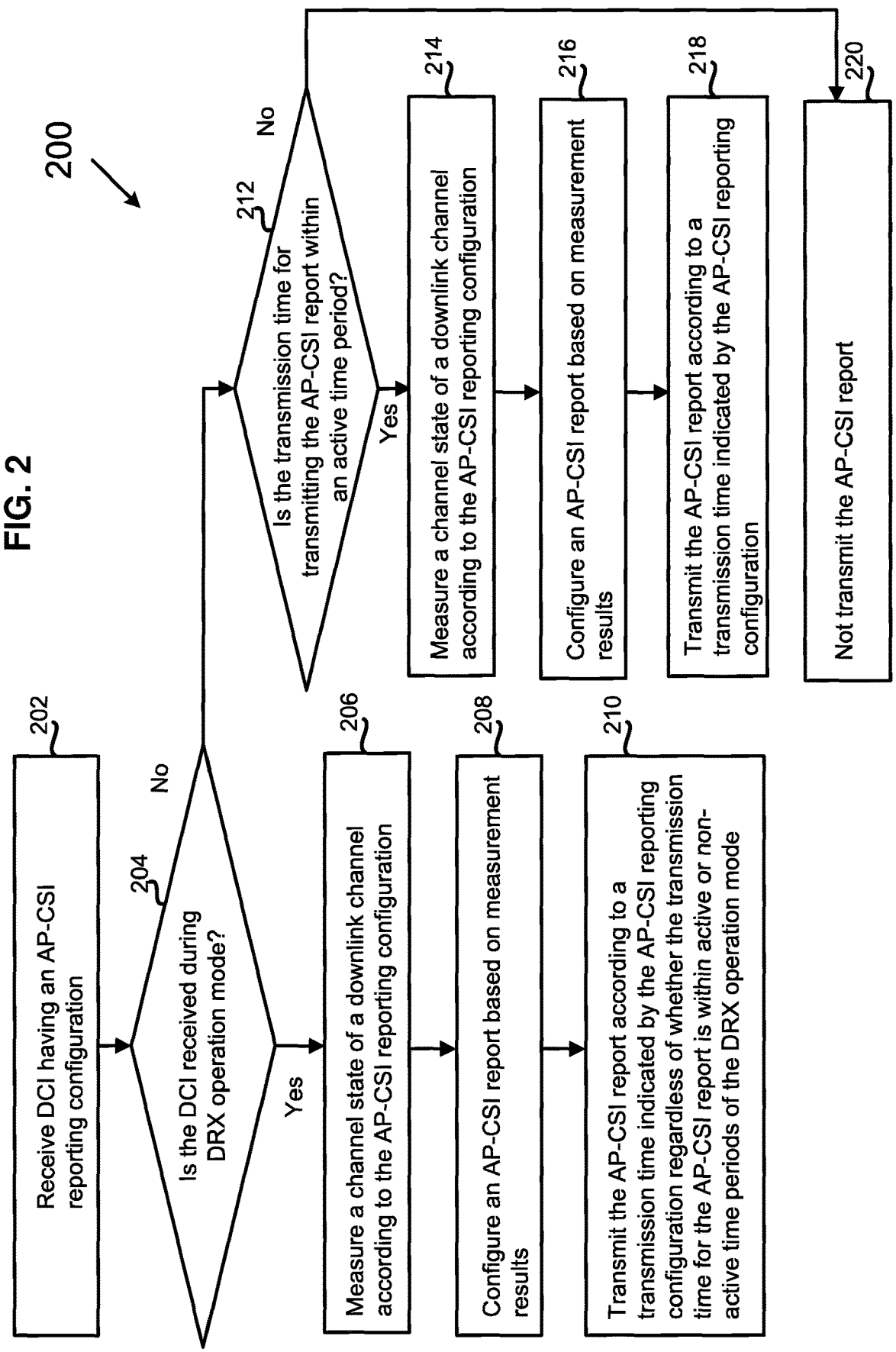
FIG. 2 is a flowchart diagram of a method by a UE for reporting CSI when the UE is in a DRX operation mode, in accordance with example implementations of the present application.

FIG. 2 is a flowchart diagram of a method by a UE for reporting CSI when the UE is in a DRX operation mode, in accordance with example implementations of the present application. In FIG. 2, flowchart 200 includes actions 202, 204, 206, 208, 210, 212, 214, 216, 218, and 220.

In action 202, the UE may receive, through reception circuitry, Downlink Control Information (DCI) from a base station. The DCI may include an aperiodic-channel state information (AP-CSI) reporting configuration.

In action 204, the UE may determine whether the DCI is received by the UE during a DRX operation mode. If the DCI is received by the UE during the DRX operation mode, flowchart 200 proceeds from action 204 to action 206. In action 206, when the DCI is received by the UE during the DRX operation mode, the UE may measure a channel state of a downlink channel according to the aperiodic CSI reporting configuration. In action 208, the UE may configure the aperiodic CSI report based on measurement results. In action 210, the UE may transmit the aperiodic CSI report according to a transmission time indicated by the aperiodic CSI reporting configuration regardless of whether the transmission time for the CSI report is within an active period or a non-active time period of the DRX operation mode.

In action 204, if the UE may determine that the DCI is not received by the UE during the DRX operation mode, flowchart 200 proceeds from action 204 to action 212. In action 212, the UE may determine whether the transmission time for transmitting the aperiodic CSI report as indicated in the AP-CSI reporting configuration is within an active or a non-active time period of the DRX operation mode, for example, when the DCI is received by the UE before the DRX operation mode. If the transmission time for transmitting the AP-CSI report is within an active time period of the DRX operation mode, then flowchart 200 proceeds from action 212 to action 214. In action 214, which is substantially similar to action 206 described above, the UE may measure a channel state of a downlink channel according to the aperiodic CSI reporting configuration.

In action 216, which is substantially similar to action 208 described above, the UE may configure the aperiodic CSI report based on measurement results.

In action 218, the UE may transmit the AP-CSI report to the base station according to the transmission time indicated by the AP-CSI reporting configuration.

In action 212, if the transmission time for transmitting the AP-CSI report is within a non-active time period of the DRX operation mode, then flowchart 200 proceeds from action 212 to action 220. In action 220, the UE does not transmit the AP-CSI report and remains non-active.

Figure 3:
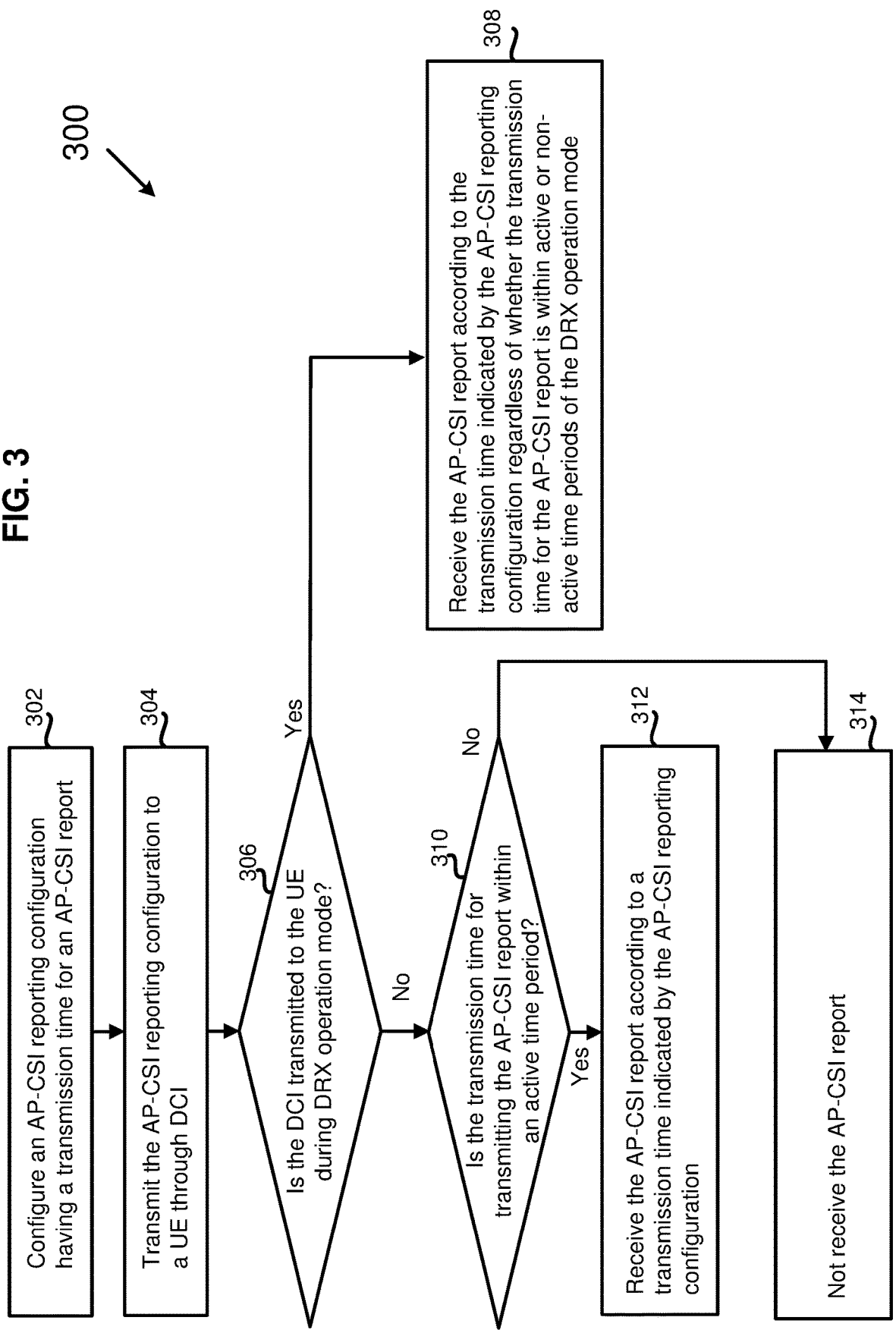
FIG. 3 is a flowchart diagram of a method by a base station for receiving CSI report(s) from a UE when the UE is in a DRX operation mode, in accordance with example implementations of the present application.

FIG. 3 is a flowchart diagram of a method by a base station for receiving CSI report(s) from a UE when the UE is in a DRX operation mode, in accordance with example implementations of the present application. In FIG. 3, flowchart 300 includes actions 302, 304, 306, 308, 310, 312, and 314.

In action 302, the base station may configure an AP-CSI reporting configuration, the AP-CSI reporting configuration having a transmission time for an AP-CSI report.

In action 304, the base station may transmit the AP-CSI reporting configuration to the UE through DCI.

In action 306, the base station may determine whether the DCI is transmitted to the UE during a DRX operation mode. If the DCI is transmitted to the UE during the DRX operation mode, flowchart 300 proceeds from action 306 to action 308. In action 308, when the DCI is received by the UE during the DRX operation mode, the base station may receive the AP-CSI report according to the transmission time indicated by the AP-CSI reporting configuration regardless of whether the transmission time for the AP-CSI report is within an active period or a non-active time period of the DRX operation mode.

If the DCI is not transmitted to the UE during the DRX operation mode, flowchart 300 proceeds from action 306 to action 310. In action 310, the base station may determine whether the transmission time for transmitting the AP-CSI report as indicated in the AP-CSI reporting configuration is within an active time period of the DRX operation.

If the transmission time for transmitting the AP-CSI report as indicated in the AP-CSI reporting configuration is within an active time period of the DRX operation, flowchart 300 proceeds from action 310 to action 312. In action 312, the base station may receive the AP-CSI report from the UE according to the transmission time indicated by the AP-CSI reporting configuration.

If the transmission time for transmitting the AP-CSI report as indicated in the AP-CSI reporting configuration is within a non-active time period of the DRX operation, flowchart 300 proceeds from action 310 to action 314. In action 314, the base station does not receive the AP-CSI report from the UE, because the UE does not transmit the AP-CSI report and remains non-active.

FIG. 4A is a diagram illustrating a UE's behaviors for reporting AP-CSI when the UE is in a DRX operation mode, in accordance with example implementations of the present application. As shown in diagram 400A, at time T402, a base station transmits an AP-CSI reporting configuration to the UE through DCI. The AP-CSI reporting configuration may include, among other parameters, a transmission time for an AP-CSI report. As shown in diagram 400A, the DCI is transmitted to the UE at time T402, where the UE is in a DRX operation mode during DRX active time period 412 of DRX cycle 410.

In the present implementation, the transmission time for the AP-CSI report is during DRX non-active time period 414 of DRX cycle 410. Based on the method described in flowchart 200 in FIG. 2, because the DCI is received by the UE during the DRX operation mode (e.g., action 204 in FIG. 2), the UE may take measurement of the channel state indicated in the AP-CSI reporting configuration to configure an AP-CSI report, and transmit an AP-CSI report to the base station based on the transmission time indicated by the AP-CSI reporting configuration. In the present implementation, the transmission time for the AP-CSI report is during DRX non-active time period 414 of DRX cycle 410. As shown in FIG. 4A, at time T404A, the UE transmits the AP-CSI report to the base station. In the present application, the AP-CSI report is multiplex on a PUSCH.

Figure 4B:
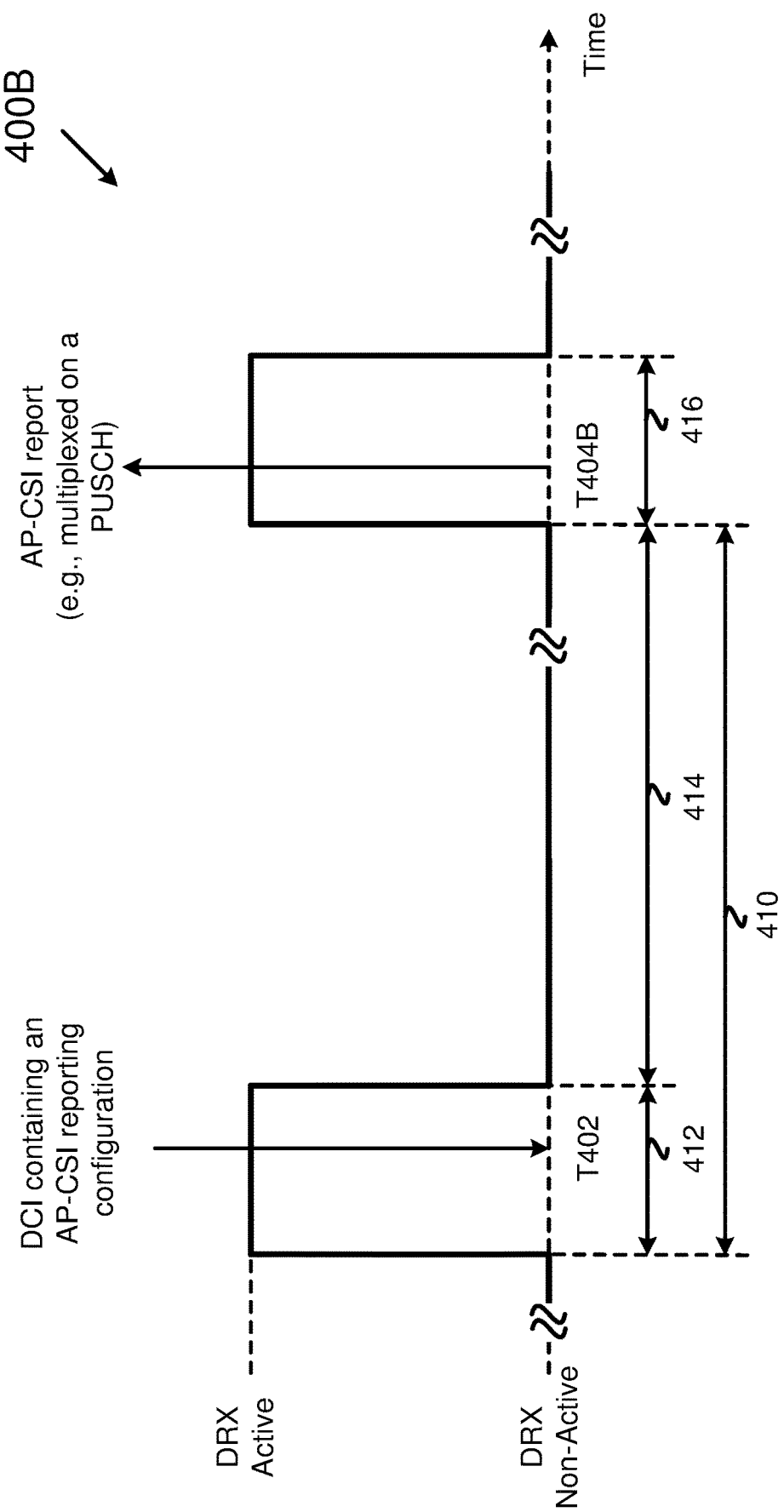
FIG. 4B is a diagram illustrating a UE's behaviors for reporting AP-CSI when the UE is in a DRX operation mode, in accordance with example implementations of the present application.

FIG. 4B is a diagram illustrating a UE's behaviors for reporting AP-CSI when the UE is in a DRX operation mode, in accordance with example implementations of the present application. Similar to FIG. 4A, in FIG. 4B, at time T402, a base station transmits an AP-CSI reporting configuration to the UE through DCI. The AP-CSI reporting configuration may include, among other parameters, a transmission time for an AP-CSI report. As shown in diagram 400B, the DCI is transmitted to the UE at time T402, where the UE is in a DRX operation mode during DRX active time period 412 of DRX cycle 410.

In the present implementation, the transmission time for the AP-CSI report is during DRX active time period 416 of a DRX cycle. Based on the method described in flowchart 200 in FIG. 2, because the DCI is received by the UE during the DRX operation mode (e.g., action 204 in FIG. 2), the UE may take measurement of the channel state indicated in the AP-CSI reporting configuration to configure an AP-CSI report, and transmit the AP-CSI report to the base station based on the transmission time indicated by the AP-CSI reporting configuration. In the present implementation, the transmission time for the AP-CSI report is during DRX active time period 416 of the DRX cycle (e.g., DRX cycle 410). As shown in FIG. 4B, at time T404B, the UE transmits the AP-CSI report to the base station. In the present application, the AP-CSI report is multiplex on a PUSCH.

As shown in FIGS. 4A and 4B, when the DCI is received by the UE during the DRX operation mode (e.g., during DRX active time period 412), the UE may transmit the AP-CSI report according to the transmission time indicated by the AP-CSI reporting configuration regardless of whether the transmission time for the AP-CSI report is within an active period (e.g., DRX active time period 416 in FIG. 4B) or a non-active time period (e.g., DRX non-active time period 414 in FIG. 4A) of the DRX operation mode.

Figure 5:
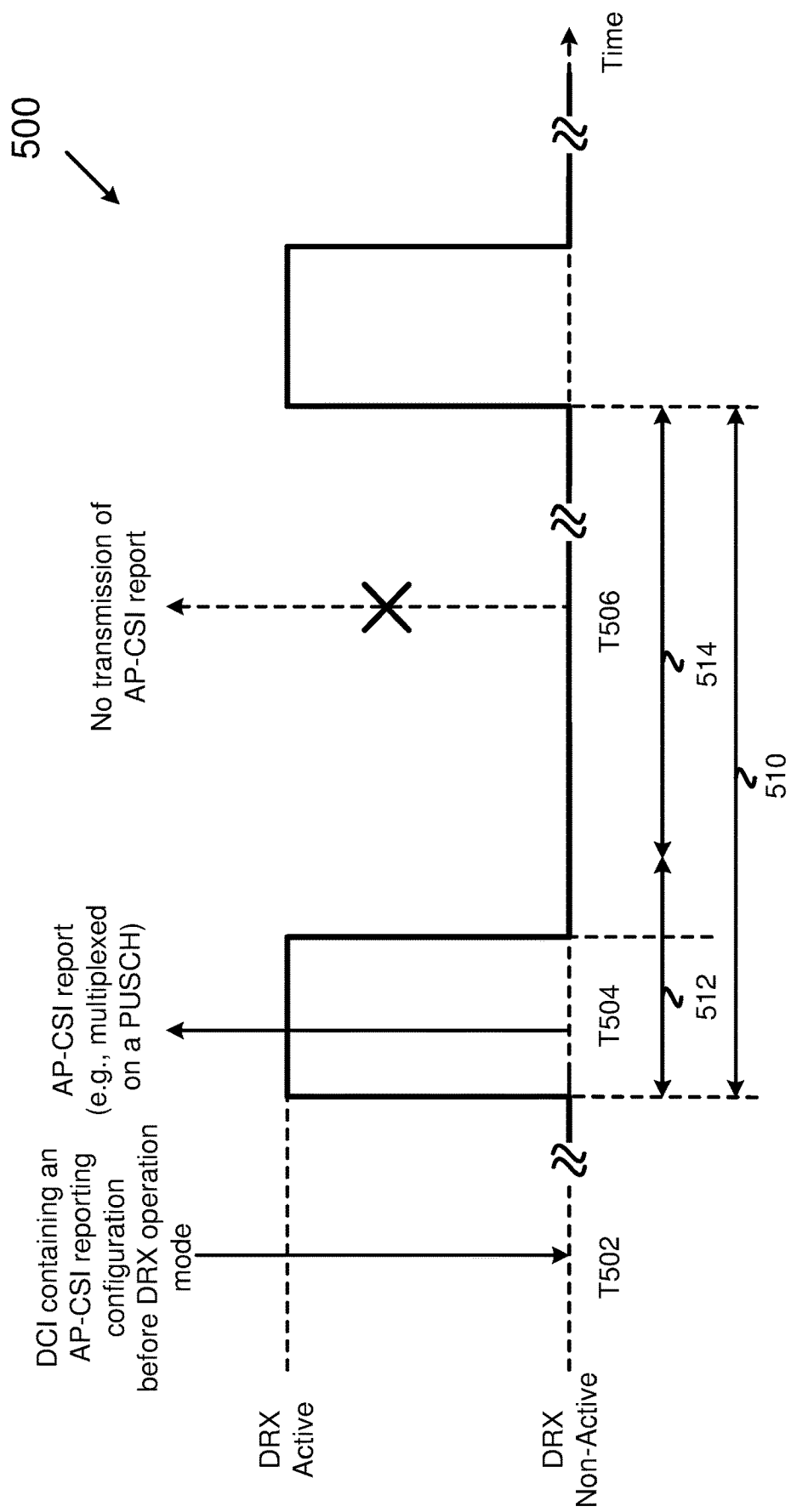
FIG. 5 is a diagram illustrating a UE's behaviors for reporting AP-CSI when the UE is in a DRX operation mode, in accordance with example implementations of the present application.

FIG. 5 is a diagram illustrating a UE's behaviors for reporting AP-CSI when the UE is in a DRX operation mode, in accordance with example implementations of the present application. As shown in diagram 500, at time T502, a base station transmits an AP-CSI reporting configuration to the UE through DCI. The AP-CSI reporting configuration may include, among other parameters, a transmission time for an AP-CSI report. As shown in diagram 500, the DCI is transmitted to the UE at time T502, before the UE is entering a DRX operation.

Based on the method described in flowchart 200 in FIG. 2, because the DCI is not received by the UE during the DRX operation mode (e.g., action 204 in FIG. 2), the UE may determine (e.g., action 212 in FIG. 2) whether the transmission time for transmitting the AP-CSI report as indicated in the AP-CSI reporting configuration is within an active or a non-active time period of the DRX operation mode.

In a case where the transmission time for transmitting the AP-CSI report is within an active time period of the DRX operation mode, the UE may transmit the AP-CSI report to the base station according to the transmission time indicated by the AP-CSI reporting configuration. For example, as shown in FIG. 5, the transmission time for the AP-CSI report is during DRX active time period 512 of DRX cycle 510. Thus, the UE may transmit the AP-CSI report to the base station at time T504. In the present application, the AP-CSI report is multiplex on a PUSCH. It should be noted that before transmitting the AP-CSI report, the UE may take measurement of the channel state indicated in the AP-CSI reporting configuration, and configure the AP-CSI report based on the measurement results, similar to actions 206 and 208 in flowchart 200 in FIG. 2.

In a case where the transmission time for transmitting the AP-CSI report is within a non-active time period of the DRX operation mode, the UE does not transmit the AP-CSI report to the base station. For example, as shown in FIG. 5, if the transmission time for the AP-CSI report is during DRX non-active time period 514 of DRX cycle 510, for example, at time T506, then the UE does not transmit the AP-CSI report to the base station.

As shown in FIG. 5, if the UE determines that the DCI is not received by the UE during the DRX operation mode, and if the transmission time for transmitting the AP-CSI report is within a non-active time period of the DRX operation mode, then the UE remains non-active, and does not transmit the AP-CSI report.

Figure 6:
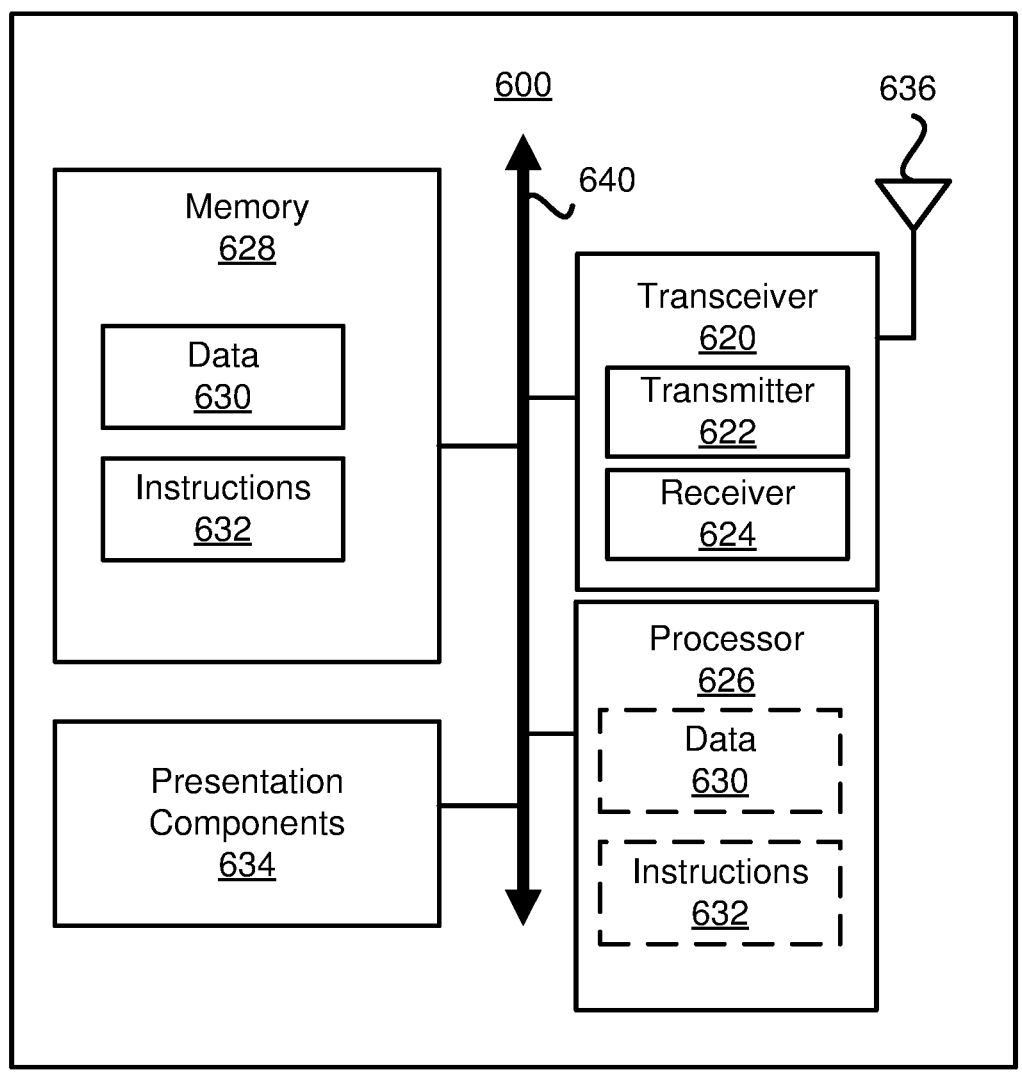
FIG. 6 is a block diagram illustrating a node for wireless communication, in accordance with various aspects of the present application.

FIG. 6 is a block diagram illustrating a node for wireless communication, in accordance with various aspects of the present application. As shown in FIG. 6, a node 600 may include a transceiver 620, a processor 628, a memory 634, one or more presentation components 638, and at least one antenna 636. The node 600 may also include an RF spectrum band module, a base station communications module, a network communications module, and a system communications management module, Input/Output (I/O) ports, I/O components, and power supply (not explicitly shown in FIG. 6). Each of these components may be in communication with each other, directly or indirectly, over one or more buses 640. In one implementation, the node 600 may be a UE or a base station that performs various functions described herein, for example, with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media can be any available media that can be accessed by the node 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 634 may include computer-storage media in the form of volatile and/or non-volatile memory. The memory 634 may be removable, non-removable, or a combination thereof. Exemplary memory includes solid-state memory, hard drives, optical-disc drives, and etc. As illustrated in FIG. 6, The memory 634 may store computer-readable, computer-executable instructions 632 (e.g., software codes) that are configured to, when executed, cause the processor 628 to perform various functions described herein, for example, with reference to FIGS. 1 through 6. Alternatively, the instructions 632 may not be directly executable by the processor 628 but be configured to cause the node 600 (e.g., when compiled and executed) to perform various functions described herein.

The processor 628 (e.g., having processing circuitry) may include an intelligent hardware device, e.g., a Central Processing Unit (CPU), a microcontroller, an ASIC, and etc. The processor 628 may include memory. The processor 628 may process the data 630 and the instructions 632 received from the memory 634, and information through the transceiver 620, the base band communications module, and/or the network communications module. The processor 628 may also process information to be sent to the transceiver 620 for transmission through the antenna 636, to the network communications module for transmission to a core network.

One or more presentation components 638 presents data indications to a person or other device. Exemplary presentation components 638 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method by a user equipment (UE), the method comprising:
   determining when a channel state information (CSI) reporting configuration is received;
   determining whether to report CSI on a resource outside a Discontinuous Reception (DRX) active time based on when the CSI reporting configuration is received; and
   reporting the CSI multiplexed with other Uplink Control Information (UCI) on a Physical Uplink Shared Channel (PUSCH) on the resource outside the DRX active time when the CSI reporting configuration is received during a DRX Active Time.

2. The method of claim 1, further comprising:
   dropping the CSI outside the DRX active time when the CSI reporting configuration is not received during the DRX Active time.

3. The method of claim 1, further comprising:
   sending the other UCI on the resource outside the DRX active time without transmitting the CSI when the CSI reporting configuration is not received during the DRX Active time.

4. The method of claim 1, wherein the resource outside the DRX active time comprises a Physical Uplink Control Channel (PUCCH) resource.

5. The method of claim 1, wherein the CSI includes at least a report type configuration of semi-persistent reporting on a Physical Uplink Control Channel (PUCCH).

6. The method of claim 1, wherein the CSI is activated during the DRX active time by at least one received Media Access Control (MAC)-Control Element (MAC-CE).

7. A user equipment (UE) comprising:
   one or more non-transitory computer-readable media having computer-executable instructions embodied thereon; and
   at least one processor coupled to the one or more non-transitory computer-readable media, and configured to execute the computer-executable instructions to:
      determine when a channel state information (CSI) reporting configuration is received;
      determine whether to report CSI on a resource outside a Discontinuous Reception (DRX) active time based on when the CSI reporting configuration is received; and
      reporting the CSI multiplexed with other Uplink Control Information (UCI) on a Physical Uplink Shared Channel (PUSCH) on the resource outside the DRX active time when the CSI reporting configuration is received during a DRX Active Time.

8. The UE of claim 7, wherein the at least one processor is further configured to execute the computer-executable instructions to:
   drop the CSI outside the DRX active time when the CSI reporting configuration is not received during the DRX Active time.

9. The UE of claim 7, wherein the at least one processor is further configured to execute the computer-executable instructions to:
   send the other UCI on the resource outside the DRX active time without transmitting the CSI when the CSI reporting configuration is not received during the DRX Active time.

10. The UE of claim 7, wherein the resource outside the DRX active time comprises a Physical Uplink Control Channel (PUCCH) resource.

11. The UE of claim 7, wherein the CSI includes at least a report type configuration of semi-persistent reporting on a Physical Uplink Control Channel (PUCCH).

12. The UE of claim 7, wherein the CSI is activated during the DRX Active Time by at least one received Media Access Control (MAC)-Control Element (MAC-CE).

* * * * *